United States Patent [19]
Odajima et al.

[11] Patent Number: 5,988,524
[45] Date of Patent: *Nov. 23, 1999

[54] SUCK BACK VALVE WITH SUCKING AMOUNT CONTROL MECHANISM

[75] Inventors: Katsuhiko Odajima, Kawaguchi; Kenichi Kurosawa, Matsudo, both of Japan

[73] Assignee: SMC Kabushiki Kaisha, Tokyo, Japan

[ * ] Notice: This patent is subject to a terminal disclaimer.

[21] Appl. No.: 09/025,242

[22] Filed: Feb. 18, 1998

[30] Foreign Application Priority Data

Apr. 7, 1997 [JP] Japan .................................. 9-088558

[51] Int. Cl.⁶ ...................................... B05B 15/00
[52] U.S. Cl. ............................... 239/119; 239/73; 239/75; 239/106; 239/586; 222/571; 251/11; 251/63.5; 251/331
[58] Field of Search ................................. 239/71, 104, 75, 239/106, 119, 583, 586, 73; 251/11, 30.02, 63.5, 331; 73/40.5 R; 222/571

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 239/71 X |
| 5,423,482 | 6/1995 | Mueller et al. | 239/119 X |

FOREIGN PATENT DOCUMENTS

8-10399   3/1996   Japan .

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve is equipped with a second valve by which a flow amount of a pressurized fluid, which is sucked by a third diaphragm, is electrically controlled based on an output of activation and deactivation signals from a main controller. The suck back valve further includes an encoder which detects a displacement amount of the third diaphragm, and outputs a detection signal thereof to the main controller.

8 Claims, 6 Drawing Sheets

NEGATIVE PRESSURE ACTION

SUCK BACK VALVE WITH SUCKING AMOUNT CONTROL MECHANISM

BACKGROUND OF THE INVENTION

1. Field of the Invention

The present invention relates to a suck back valve capable of preventing liquid drip of a fluid from occurring at a supply port, by sucking a prescribed amount of fluid flowing through a fluid passage based on a displacement operation of a diaphragm.

2. Description of the Related Art

There has hitherto been known, for example, a semiconductor wafer manufacturing process in which a suck back valve is employed. In the suck back valve, when supply of a coating liquid to the semiconductor wafer is halted, there is a function for preventing so called liquid drip, wherein minute amounts of coating liquid drip from a supply port onto the semiconductor wafer.

Figure 6:
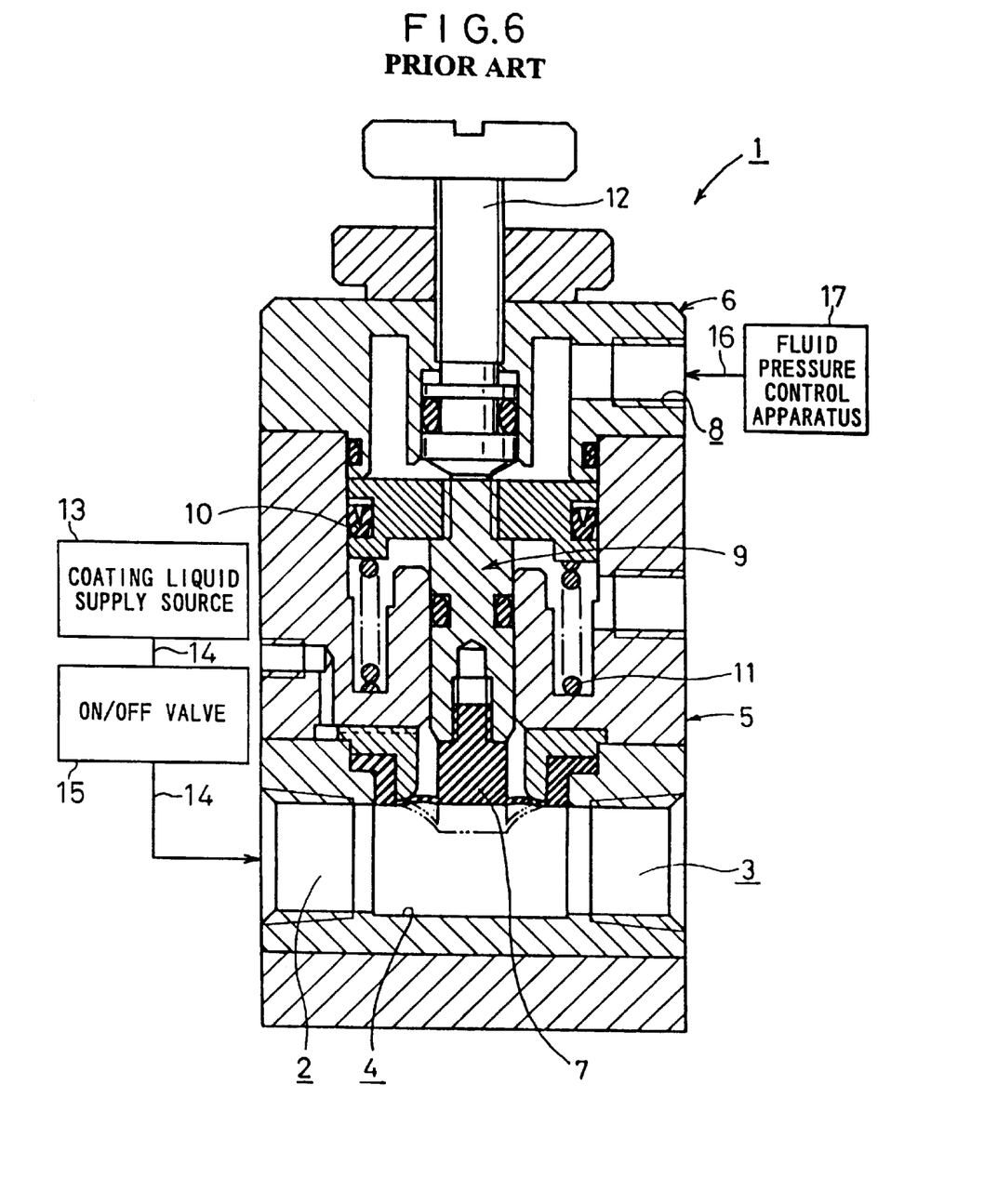
FIG. 6 is a vertical cross-sectional view of a suck back valve according to the conventional technique.

The suck back valve according to such a conventional technique is shown in FIG. 6 and is disclosed, for example, by Japanese Utility Model Publication No. 8-10399.

Such a suck back valve 1 comprises a main valve body 5 formed with a fluid passage 4 interconnecting a fluid inlet port 2 and a fluid outlet port 3, and includes a bonnet 6 connected to an upper portion of the main valve body 5. A diaphragm 7 made up of a thick-walled portion and a thin-walled portion is disposed in the center of the fluid passage 4. An unillustrated pressurized fluid supply source is connected to the bonnet 6, the bonnet further being formed with a pressurized fluid supply port 8 for supplying pressurized air for operating a diaphragm under a switch-over action of a directional control valve (not shown).

A piston 9 is fitted to the diaphragm 7, with a v-packing 10 installed in the piston 9 and slidable along an inner wall surface of the main valve body 5 and serving a sealing function. Further, a spring 11 which normally presses the piston in a upward direction, is disposed in the main valve body 5.

An adjusting screw 12 is disposed on the top of the bonnet 6, which, by increasing or decreasing a screw-in amount thereof, abuts against the piston 9 and adjusts a displacement amount of the piston 9, whereby the amount of coating liquid sucked by the diaphragm 7 is adjusted.

A coating liquid supply source 13 storing therein a coating liquid is connected to the fluid inlet port 2 through a pipe 14. Further, between the coating liquid supply source 13 and the fluid inlet port 2, and ON/OFF valve 15, which is constructed as a separate body apart from suck back valve 1, is connected. The ON/OFF valve undertakes a function for switching between a supply condition and a supply-halted condition of the coating liquid to the suck back valve 1, based on energizing and de-energizing actions of the ON/OFF valve 15.

Figure 5:
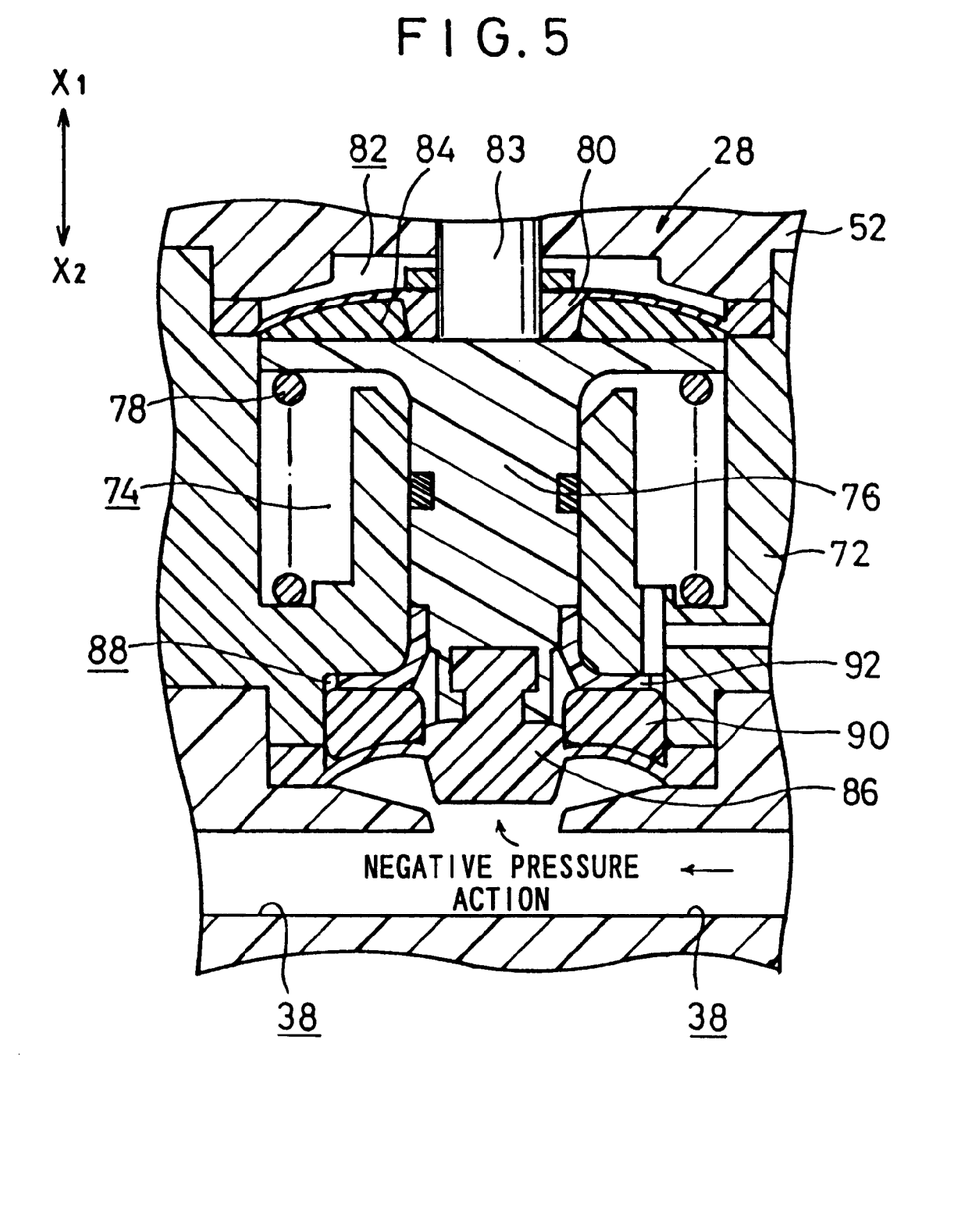
FIG. 5 is a view explaining the operation of the suck back valve shown in FIG. 1.

Operation of the suck back valve 1 shall now be explained in outline. In an ordinary state in which the fluid is supplied from the fluid-inlet port 2 to the fluid-outlet ports, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 5 by the two-dot chain lines.

When flow of fluid through the fluid passage 4 is halted, the piston 9 and diaphragm 7 are raised in unison under the action of an elastic force exerted by the spring 11, by stopping the supply of pressurized fluid from the pressurized fluid supply port 8. A predetermined amount of fluid remaining in the fluid passage 4 is sucked under action of a negative pressure produced by the diaphragm 7. Thus, dripping of liquid, which would otherwise be caused at an unillustrated fluid supply port, is prevented.

In this instance, the suck back amount of the coating liquid corresponds with displacement of the piston 9, wherein a displacement amount of the piston 9 is adjusted by the screw element 12.

Incidentally, using the suck back valve 1 according to the conventional technique, in order to adjust with high precision the flow amount of pressurized air which is supplied to the pressurized fluid supply port 8, a fluid pressure control apparatus 17 is connected to the pressurized fluid supply port 8 through a pipe 16 such as tube or the like. The fluid pressure control apparatus 17 is formed as a separate body apart from the suck back valve 1, and comprises a piezoelectric element bimorph cell arranged therein which converts an electric signal into air pressure.

However, in the suck back valve 1 according to the conventional technique, because adjustment of the coating liquid suck back amount is performed by manually increasing/decreasing the screw-in amount of the screw member 12, there is the inconvenience that precise control of the coating liquid suck back amount cannot be achieved. In this case, it becomes necessary to readjust each time the amount at which the preset screw member 12 is screwed in, corresponding with the amount of supply of the coating liquid, resulting in further complexity.

Further, with the suck back valve according to the conventional technique, because there is some difficulty in reproducing the displacement amount, with respect to a voltage imposed by a hysteresis action possessed by the piezoelectric element bimorph cell disposed in the fluid pressure control apparatus, it becomes difficult to control with precision the flow rate of pressurized air supplied to the pressurized fluid supply port 8, with the further inconvenience that displacement speed of the piston when the coating liquid is sucked cannot be precisely controlled.

Further, when the suck back valve 1 according to the conventional technique Is used, complications arise in that it becomes necessary to undertake pipe connecting operations between the suck back valve 1 and the fluid pressure control apparatus 17, as well as between the suck back valve 1 and the ON/OFF valve 15. In addition, because the fluid pressure control apparatus 17 and ON/OFF valve 15 are respectively installed externally of the suck back valve 1, dedicated space for such elements must be provided, increasing the installation space overall.

Further still, flow passage resistance increases as a result of piping connected between the fluid pressure control apparatus 17 and the suck back valve 1, with the inconvenience that responsiveness and precision of the diaphragm becomes deteriorated.

Even further, a driving device (not shown) for switching between ON and OFF states of the ON/OFF valve 15 must be separately provided, wherein in addition to the complexity of further pipe connecting operations for the ON/OFF valve 15 and the driving apparatus, soaring costs for the apparatus are incurred.

SUMMARY OF THE INVENTION

A general object of the present invention is to provide highly accurate control of a pilot pressure used to displace a flexible material (diaphragm) installed in facing relation to a fluid passage, as well as provide a suck back valve which can control with high precision the flow amount fluid sucked by the flexible material.

A main object of the present invention is to provide a suck back valve in which piping connection operations are unnecessary, and thereby reduce the installation space of the overall apparatus.

Another object of the present invention is to provide a suck back valve in which the responsiveness and accuracy of the above-mentioned flexible material (diaphragm) is improved.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
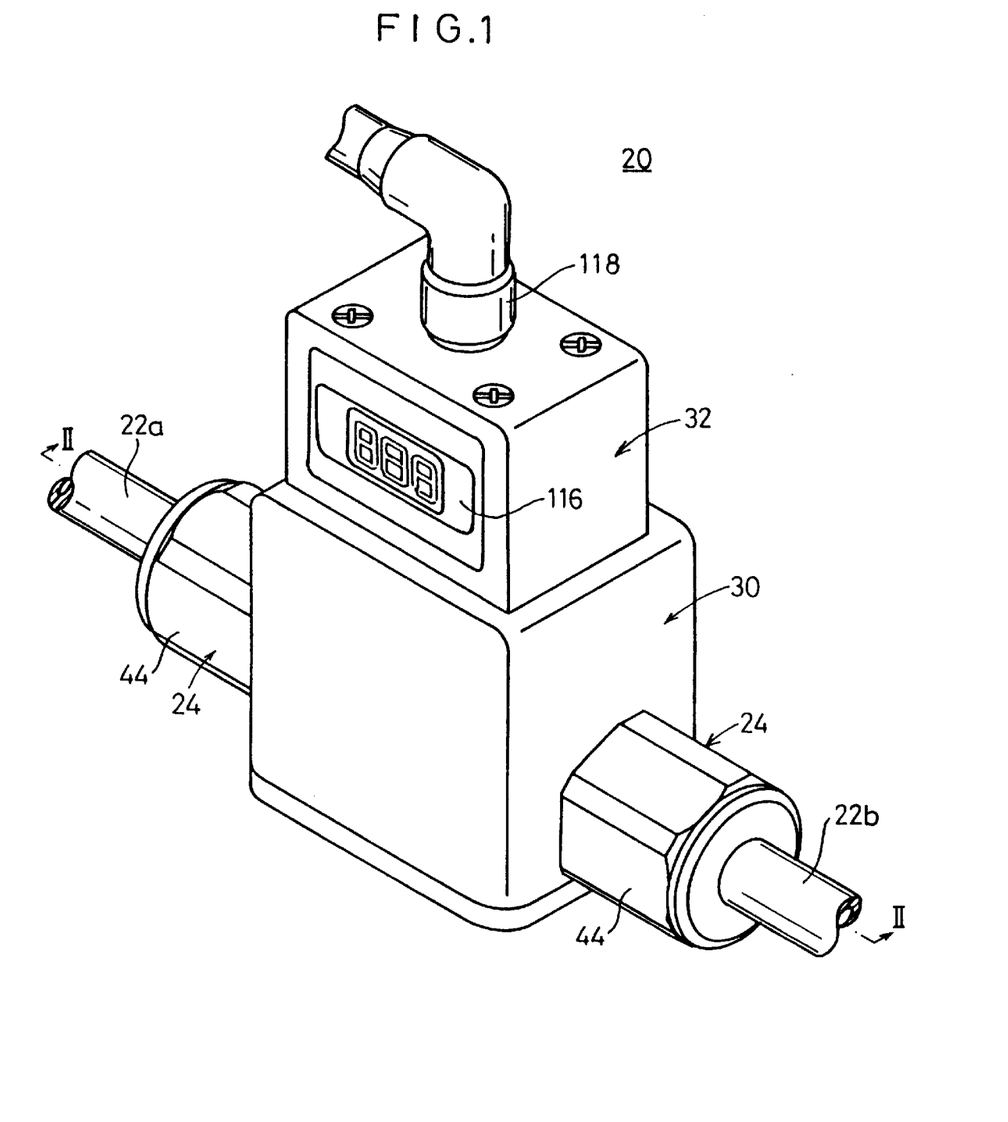
FIG. 1 is a perspective view of the suck back valve according to an embodiment of the present invention.

In FIG. 1, reference numeral 20 indicates the suck back valve in accordance with an embodiment of the present invention. The suck back valve 20 is constructed by a fitting 24 to which are connected at a fixed separation a pair of detachable tubes 22a, 22b, an actuator 30 having a suck back mechanism 28 (see FIG. 2) and an ON/OFF valve 26 disposed on top of said fitting, and a controller 32 for controlling switching of pressurized fluid supplied respectively to the ON/OFF valve 26 and the suck back mechanism 28, together with controlling a pressure (pilot pressure) of a pressurized fluid supplied to the suck back mechanism 28. Further, the fitting 24, actuator 30 and controller 32, as shown in FIG. 1, are integrally assembled together.

Figure 2:
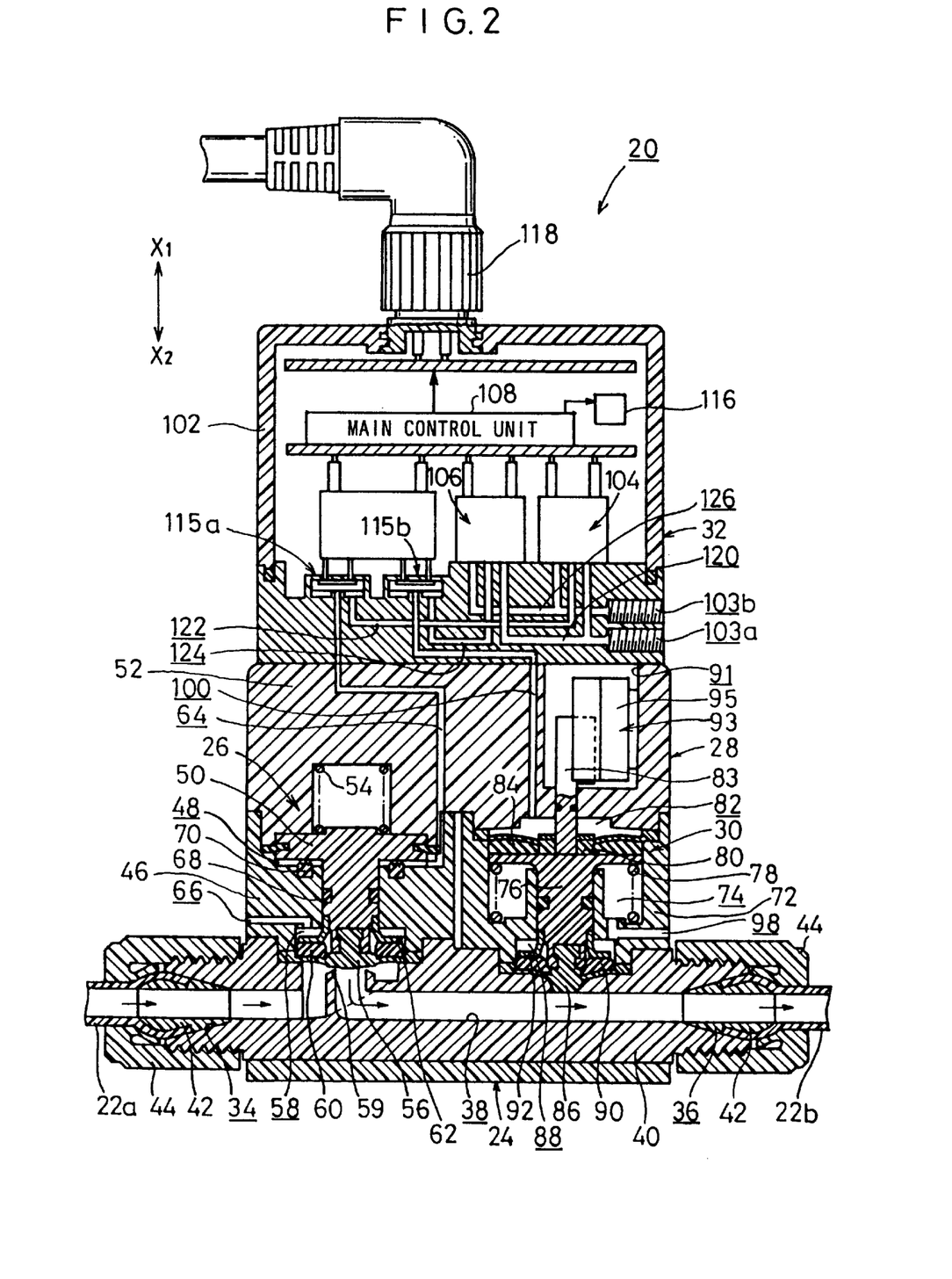
FIG. 2 is a vertical cross-sectional view along line II—II shown in FIG. 1.

As shown in FIG. 2, a first port 34 is formed on one end, and a second port 36 is formed on another end of the fitting 24. In addition, the fitting 24 comprises a coupling body 40 having disposed therein a fluid passage 38 providing communication between the first port 34 and the second port 36, inner member 42 coupled respectively to the first and second ports 34, 36 and inserted into openings of tubes 22a, 22b, and lock nuts 44 for maintaining a fluid-tight seal at the connecting parts of tubes 22a, 22b by screwing the lock nuts into screw threads engraved into ends of the coupling body 40.

The ON/OFF valve 26 is disposed on an upper part of the fitting 24 in the vicinity of the first port 34. The ON/OFF valve 26 includes a first valve body 46 integrally connected to the coupling body 40, a piston 50 displaceable in directions of arrows $X_1$ and $X_2$ along a cylinder chamber 48 formed on the interior of the first valve body 46, and a cover member 52 hermetically fitted into the cylinder chamber 48. The cover member 52 also extends over the suck back mechanism 28.

Between the piston 50 and the cover member 52, a spring element 54 is installed, wherein due to an elastic force of the spring element 54, the piston 50 is in a condition in which normally it is biased in a downward direction (i.e. the direction of arrow $X_2$).

At a lower end of the piston 50, a first diaphragm chamber 58 is formed in which a first diaphragm 56 is sealingly fitted, the first diaphragm 56 being connected to a lower end of the piston 50 and disposed such that it is displaced in unison with the piston 50. In this case, by separating the first diaphragm 56 from a seat 59 formed in the coupling body 40, and further by seating the first diaphragm 56 onto the seat 59, a function for opening and closing of the fluid passage 38 is performed. Accordingly, switching between a supply condition and a condition for halting supply of the fluid (for example a coating fluid) which flows through the fluid passage 38 can be performed based on an opening/closing action of the ON/OFF valve 26.

In addition, an annular cushioning member 60 is disposed on an upper surface of the first diaphragm 56 for protecting a thin-walled portion of the first diaphragm 56, the cushioning element 60 being supported by a cross-sectionally L-shaped support member 62 which is connected to a lower end of the piston 50.

A first pilot passage 64, making communication between a flow amount control device (described later on) and a cylinder chamber 48 of the ON/OFF valve 26, is formed in the first valve body 46. In this case, based on supply of a pressurized fluid (pilot pressure) to the inside of the cylinder chamber 48 through pilot passage 64 under a control operation of the flow amount control device, piston 50 is raised upwardly in resistance to the elastic force of the spring element 54. Accordingly, the first diaphragm 56 separates a predetermined distance from the seat 59, opening the fluid passage 38, wherein fluid flows in a direction from the first port 34 to the second port 36.

Further, a passage 66 making communication between the first diaphragm chamber 58 and atmosphere is formed in the first valve body 46. The first diaphragm 56 can be freely operated by supply and discharge of air from inside the diaphragm chamber 58 through the first passage 66. Reference numeral 68 indicates a seal for preserving airtightness of the cylinder chamber 48, whereas reference numeral 70 shows a cushioning member which abuts with the piston 50 serving a cushioning function.

A suck back mechanism 28 is disposed on top of the fitting 24 in proximity to the second port 36. The suck back mechanism 28 includes a second valve body 72 integrally connected to the coupling body 40 and to the first valve body 46, and a stem 76 displaceable in directions of arrows $X_1$ and $X_2$ along a chamber 74 formed in the interior of the second valve body 72. A spring element 78 is disposed in the chamber 74, which contacts a flange of the stem, normally applying a force therein in an upward direction (i.e. direction of arrow $X_1$) due to the elastic force of the spring element 78.

A second diaphragm 80 extends from an upper part of the stem 76 and connects to an upper surface of the stem 76. A second diaphragm chamber (pilot chamber) 82 is formed for actuating the second diaphragm 80 by supplying a pilot pressure in an upward direction of the second diaphragm 80. A shaft 83 is disposed on an upper surface part of the stem 76, penetrating through the second diaphragm 80, the shaft 83 being displaced integrally with the stem 76. In this case, a cushioning member 84, formed of a rubber material or the like, is interveningly disposed between a thin-walled portion of the second diaphragm 80 and the stem 76.

On the other hand, a third diaphragm chamber 88 is formed at the lower end of the stem 76, which is sealed off by a third diaphragm 86, the third diaphragm 86 being connected to the stem 76 and disposed so as to be displaced in unison with the stem 76.

An annular cushioning member 90 is disposed on an upper surface of the third diaphragm 86 for protecting a thin-walled section of the third diaphragm 86, wherein the cushioning member 90 is supported by a cross-sectionally L-shaped support member 92 connected to a lower end of the stem 76.

A passage 98 is formed in the second valve body 72 providing communication between the third diaphragm chamber 88 and atmosphere. On the other hand, a pilot passage 100 is formed in the cover member 52 for supplying a pilot pressure to the second diaphragm chamber 82.

An encoder 93 which detects a displacement amount of the second diaphragm 80 is fixed in a cavity 91 of the cover member 52 through shaft 83. The encoder 93 is of a substantially absolute type, having an unillustrated photosensor fixed to one side of the encoder main body 95, and a glass scale (not shown) formed with scale values at fixed intervals on a glass substrate, and fixed to a side of the shaft 83.

In this case, the displacement amount of the shaft 83, which is displaced integrally with the second diaphragm 80, is detected by the unillustrated photosensor via the glass scale, and a detection signal output from the photosensor is input to the main control unit 108 through unillustrated leads.

The controller 32 includes a bonnet 102 assembled integrally with the first valve body 46 and the second valve body 72 which together make up the actuator 30, wherein a pressurized fluid supply port 103a and a pressurized fluid discharge port 103b are formed in the bonnet 102.

Inside the bonnet 102, there are arranged a first electromagnetic valve 104, functioning substantially as a 2-port, 3-way valve for controlling a pilot pressure supplied to the cylinder chamber 48 of the ON/OFF valve 26, and a second electromagnetic valve 106, functioning substantially as a 2-port 3-way valve for controlling a pilot pressure supplied to the second diaphragm chamber 82 of the suck back mechanism 28.

The first and second electromagnetic valves 104, 106 respectively are normally closed type valves, wherein by outputting current signals from the main control unit 108 with respect to electromagnetic coils 112 of the respective first and second electromagnetic valves 104, 106, unillustrated valve bodies are drawn in the direction of arrow $X_1$, thereby resulting in an open-valve condition.

Further, a first flow amount control device 115a and a second flow amount control device 115b, which supply a pressurized fluid (pilot pressure) controlled at a fixed pressure value respectively to the cylinder chamber 48 of the ON/OFF valve 26 and to the second diaphragm chamber 82 of the suck back mechanism 28, are disposed inside the bonnet 102.

Figure 4A:
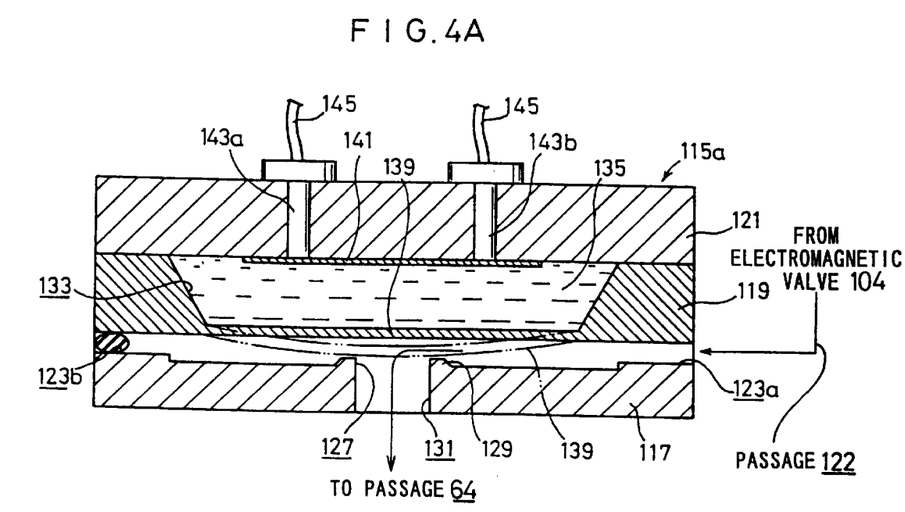
FIGS. 4A and 4B are vertical cross-sectional views of a flow quantity control device which makes up part of the suck back valve shown in FIG. 1.
Figure 4B:
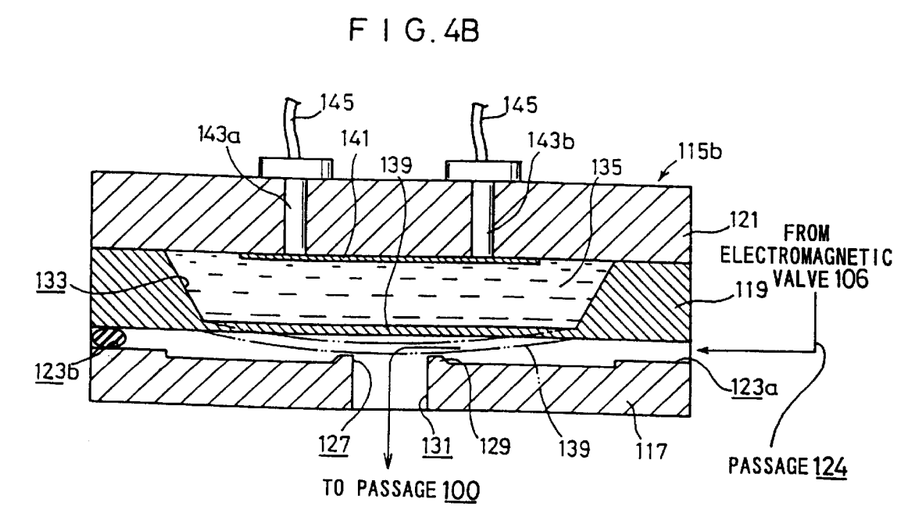

The first flow amount control device 115a and the second flow amount control device 115b are both formed of the same constituent elements and, as shown in FIGS. 4A and 4B, are formed by a first wafer 117 formed for example from Pyrex glass, a second wafer 119 fixed to an upper surface of the first wafer 112 and made up for example from a silicon substrate, and a third wafer 121 fixed to an upper surface of the second wafer 119 and formed for example from Pyrex glass, which are integrally stacked together.

Between the first wafer 117 and the second wafer 119. a pair of inlet ports 123a, 123b are formed at a fixed separation from each other, one inlet port 123b is closed by a blank plug. As shown in FIG. 4A, the inlet port 123a of the first flow amount control device 115a is provided to communicate with the first electromagnetic valve 104 through a second passage 122, while the inlet port 123a of the second flow amount control device 115b is provided to communicate with the second electromagnetic valve 106 through a third passage 124, as shown in FIG. 4B.

A nozzle 129 formed with a nozzle hole 127 is disposed between the pair of inlet ports 123a, 123b, wherein the nozzle hole 127 is formed to communicate with an outlet port 131 which opens to a lower surface part of the first wafer 117. As shown in FIG. 4A, the outlet port 131 of the first flow amount control device 115a is provided to communicate with the ON/OFF valve 26 through the first pilot passage 64, while the outlet port 131 of the second flow amount control device 115b is provided to communicate with the second diaphragm chamber 82 of the suck back mechanism 28 through the second pilot passage 100, as shown in FIG. 4B.

A trapezoidal cross-sectioned chamber 133 is formed in the interior of the second wafer 119, and an expandable fluid 135 which expands due to heating, for example a silicon liquid, is enclosed in the chamber 133. A thin-film structure 139 is formed on the lower part of the chamber 133, wherein the film.139 is separated by a fixed distance from an end of the nozzle 129, and is flexibly formed to flex toward the nozzle 129 upon expansion of the fluid 135 (as shown by the two-dot-chain line in FIGS. 4A and 4B).

A patterned electrical resistance body 141 is disposed on an underside of the third wafer 121 constructed on an upper surface of the chamber 133. The electrical resistance pattern 141 is electrically connected to the main control unit 108 through a pair of electric terminals 143a, 143b and lead lines 145.

A pressure value, set by an unillustrated key-input device through connector 118, is displayed on an LED display device 116. Further, the main control unit 108 includes an unillustrated MPU (microprocessor unit) possessing various functional means therein for performing control, evaluation, processing, computation and memory storage. Based on control signals derived from the MPU, pilot pressure supplied respectively to the cylinder chamber 48 of the ON/OFF valve 26 and to the diaphragm chamber 82 of the suck back mechanism 28 is controlled by energizing and deenergizing the first and second electromagnetic valves 104 and 106.

Figure 3:
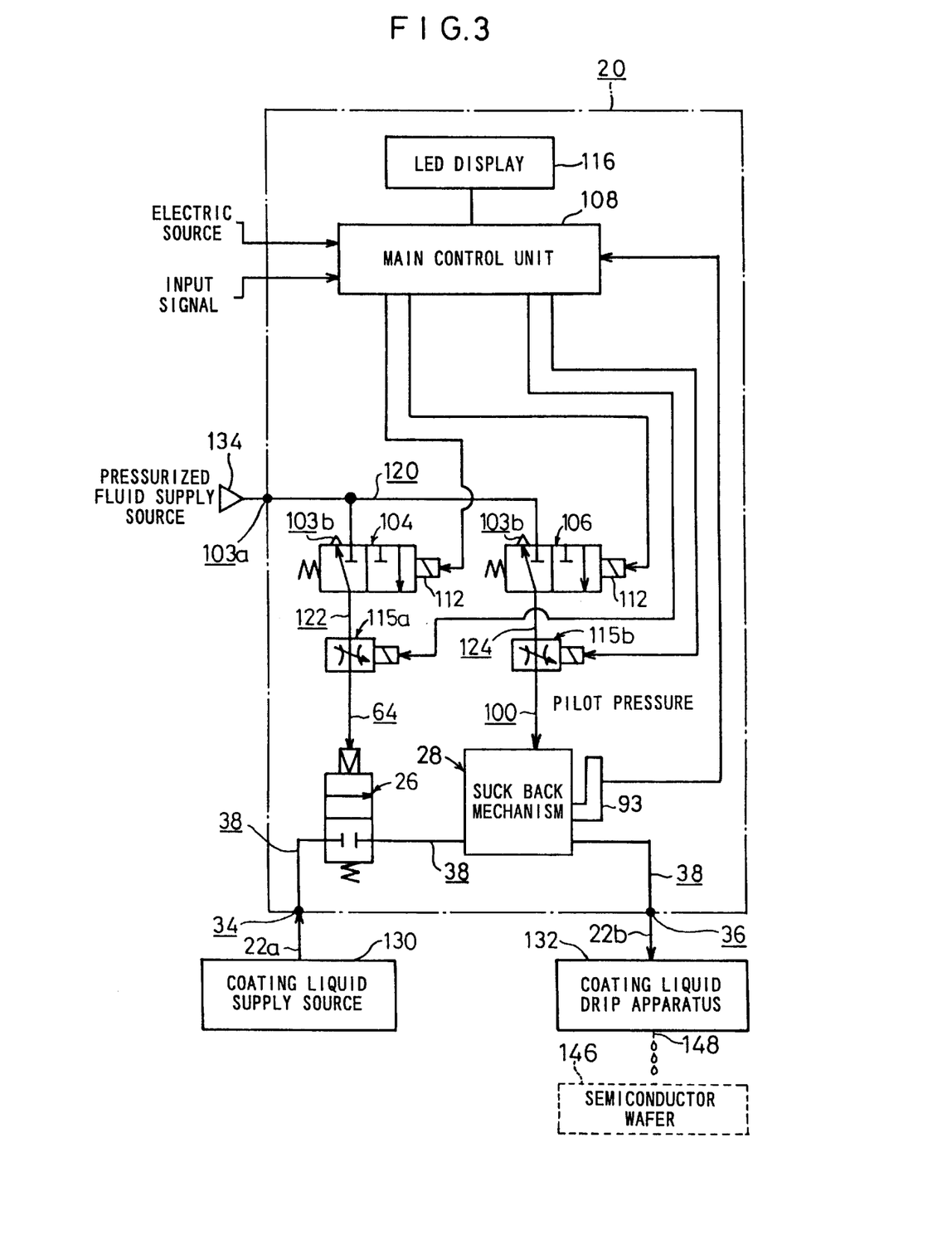
FIG. 3 is a circuit block diagram for the suck back valve shown in FIG. 1.

Further, formed in the bonnet 102, as shown in FIG. 3, are a first passage 120 supplying a pressurized fluid from the pressurized fluid supply port 103a respectively to the first electromagnetic valve 104 and the second electromagnetic valve 106, a second passage 122 providing communication between the first electromagnetic valve 104 and the first fluid control means 115a, and a third passage 124 providing communication between the second electromagnetic valve 106 and the second fluid control means 115b.

In addition, disposed in the bonnet 102, are a first pilot passage 64 supplying a pilot pressure to the cylinder chamber 48 of the ON/OFF valve 26 which is connected to an outlet port 131 of the first flow amount control device 115a, a second pilot passage 100 for supplying pilot pressure to the second diaphragm chamber 82 of the suck back mechanism 28 connected to the outlet port 131 of the second flow amount control device 115b, and a fourth passage 126 providing communication between the first and second electromagnetic valves 104, 106 and the pressured fluid discharge port 103b (refer to FIG. 2).

In this case, when a current signal is supplied from the main control unit 108 to the electromagnetic coil 112 of the first electromagnetic valve 104, an unillustrated valve body is displaced wherein the first electromagnetic valve 104 assumes an ON condition, and the first passage 120 and the second passage 122 are brought into mutual communication with each other. As a result, pressurized fluid (pilot pressure) supplied from the pressurized fluid supply port 103a is supplied to the first flow amount control device 115a through first and second passages 120 and 122.

On the other hand, when a current signal is supplied from the main control unit 108 to the electromagnetic coil 112 of the second electromagnetic valve 106, an unillustrated valve body is displaced and the second electromagnetic valve assumes an ON state, whereby the first passage 120 and the third passage 124 are brought into communication with each other. Accordingly, pressurized fluid (pilot pressure) supplied from the pressurized fluid supply port 103a is supplied to the second flow amount control device 115b through first and third passages 120 and 124.

The suck back valve 20, according to this embodiment, is basically constructed as described above. Next, the actions and operational effects thereof shall be described in reference to the circuit structure diagram shown in FIG. 3.

First, a coating liquid supply source 130 storing therein a coating liquid is connected to a tube 22a which communicates with the first port 34 of the suck back valve 20, whereas a coating liquid drip apparatus 132 comprising a nozzle 136 from which a coating liquid drips onto the semiconductor wafer 138, is connected to a tube 22b which communicates with the second port 36. Further, a pressurized fluid supply source 134 is connected to the pressurized fluid supply port 103a.

After undertaking such preparatory measures, the pressurized fluid supply source 134 is activated, introducing a pressurized fluid to the pressurized fluid supply port 103, together with introducing an input signal and an electrical source signal to the main control unit 108 via an unillustrated input means.

Based on the input signal, the main control unit 108 outputs energizing signals to the first electromagnetic valve 104 and the second electromagnetic valve 106, so that the first and second electromagnetic valves 104, 106 respectively assume an ON condition.

The pressurized fluid (pilot pressure) introduced from the pressurized fluid supply port 103a is introduced into the second flow amount control device 115b through mutually communicating first passage 120 and third passage 124. The second flow amount control device 115b, as shall be described in more detail later, after compressing the pressured fluid under a flexure action of thin-film 139 to a predetermined pilot pressure, supplies the pressurized fluid to the second diaphragm chamber 82 via the second pilot passage 100. Under action of the pilot pressure supplied to the second diaphragm chamber 82, the second diaphragm 80 flexes, pressing the stem 76 in the direction of arrow $X_2$. As a result, the third diaphragm 86 connected to the lower end of the stem 76 is displaced, resulting in the condition shown by FIG. 2.

In this manner, under an action of the pilot pressure supplied to the second diaphragm chamber 82, in a state in which the diaphragm 80 is pressed in the direction of arrow $X_2$, the main control unit 108 outputs an electric signal to the first flow amount control device 115a. In the flow amount control device 115a, a current is caused to flow to the electrical resistance body 141 through electrical contacts 143a, 143b, and the electrical resistance body 141 is heated.

As a result, the fluid 135 which fills the chamber 133 is heated and expands, and as shown by the two-dot-chain line in FIG. 4A, thin-film 139 is pressed and flexes downward, wherein the separation distance between the film 139 and the nozzle 129 is set to a fixed amount. Accordingly, the flow amount of pressurized fluid which flows toward the outlet port 131 from the nozzle hole 127 is controlled by compression in accordance with the separation distance between the thin film 139 and the nozzle 129. As a result, the flow amount of pressurized fluid discharged from the outlet port 131 of the first flow amount control device 115a is adjusted, and thereby the pilot pressure supplied to the cylinder chamber 48 of the ON/OFF valve 26 is controlled to a fixed value.

Further, because operations of the second flow amount control device 115b are the same as those of the aforementioned first flow amount control device 115a, the pilot pressure supplied to the second diaphragm chamber 82 is likewise controlled to a fixed value (see FIG. 4B).

Pressurized fluid (pilot pressure) introduced to the cylinder chamber 48 displaces the piston 50 in the direction of arrow Xin resistance to the elastic force of spring element 54. Accordingly, the first diaphragm 56 which is connected to the piston separates from the seat 59, and ON/OFF valve 26 assumes an ON condition. At that time, coating liquid from the coating liquid supply source 130 flows along flow passage 38, and via the coating liquid drip apparatus 146, the coating liquid is dripped onto the semiconductor wafer 146. As a result, a coating layer (not shown) having a desired thickness is formed on the semiconductor wafer 146.

After a predetermined amount of coating liquid has been coated on the semiconductor wafer 146 by the coating liquid drip apparatus 132, main control unit 108 outputs a deactivating signal to the first electromagnetic valve 104, and the first electromagnetic valve 104 assumes an OFF state. Accordingly, the second passage 122 is put into communication with the pressurized fluid discharge port 103b, and pressurized fluid inside the cylinder chamber 48 is discharged to atmosphere through the pressurized fluid discharge port. As a result, the piston is displaced in the direction of arrow $X_2$ under action of the elastic force of spring elements 54, and the first diaphragm 56 is seated on valve seat 59, so that the ON/OFF valve 26 assumes an OFF state.

By putting ON/OFF valve 26 in an OFF state and interrupting the fluid passage 38, the supply of coating liquid to the semiconductor wafer 146 is stopped, whereby dripping of coating liquid with respect to the semiconductor wafer 146 from nozzle 148 of the coating liquid drip apparatus 132 is halted. In this case, because coating liquid immediately preceding that which has dripped onto the semiconductor wafer 146 remains inside the nozzle 148 of the coating liquid drip apparatus 132, there is the fear that unwanted dripping of liquid may occur.

Therefore, the main control unit 108 issues a deactivation signal to the second electromagnetic valve 106, whereby the second electromagnetic valve 106 assumes an OFF state.

Accordingly, by putting the second electromagnetic valve 106 in an OFF state, the third passage 124 and the pressurized fluid discharge port 103b are placed in communication, wherein pressurized fluid (pilot pressure) remaining in the second diaphragm chamber 82 is discharged to atmosphere from the pressurized fluid discharge port 103b via the second pilot passage 100 and the third passage 124 which are in mutual communication with each other. As a result, the second diaphragm 80 is raised in the direction of arrow $X_1$ under action of the elastic force of spring element 78, attaining the condition shown in FIG. 5.

More specifically, by raising the second diaphragm 80, and displacing the third diaphragm 86 in the direction of arrow $X_1$ in unis on therewith through the stem 76, a negative pressure action is generated. When this occurs, a predetermined amount of coating liquid inside the fluid passage 38 is sucked along the direction of the arrows shown in FIG. 5. As a result, a predetermined amount of coating liquid which remains in the nozzle 148 of the coating liquid drip apparatus 132 is returned toward the side of the suck back valve, so that liquid dripping can be prevented from occurring with respect to the semiconductor wafer 138.

When this happens, a displacement amount of the second diaphragm 80 which is raised integrally with the third diaphragm 86 is detected by an encoder 93 through shaft 83. Based on a detection signal output from the encoder 93, the main control unit 108 adjusts the pressure inside of the second diaphragm chamber 82, so as to stop the second diaphragm 80 at a preset position.

More specifically, the second diaphragm 80 is formed so as to be stopped at a fixed position which equalizes the pressure inside the second diaphragm chamber 82 with the elastic force of the spring element 78. The main control unit 108 evaluates the displacement amount of the second diaphragm 80 based on the detection signal output from the encoder 93, and issues energizing and/or deenergizing signals, switching suitably between ON and OFF states and thereby adjusting the pressure inside the second diaphragm chamber 82, equalizing the same with the elastic force of the spring element 78, whereby the second diaphragm 80 is stopped at a position corresponding to a suck back amount of the coating liquid.

In this case, it is also acceptable that the main control unit 108 outputs respective energizing and deenergizing signals for the second electromagnetic valve 106 and the second flow amount control device 115b, wherein the second electromagnetic valve 106 and the second flow amount control device 115b can be employed together for adjusting pressure in the second diaphragm chamber 82.

By once again issuing respective activating signals for the first electromagnetic valve 104 and second electromagnetic valve 106 from the main control unit 108, and returning to an ON state, the condition shown in FIG. 2 is reached, wherein dripping of coating liquid onto the semiconductor wafer 146 is reinitiated.

In this manner, according to the embodiment of the present invention, the second diaphragm 80 is stopped at a position which equalizes the pressure of the second diaphragm chamber 82 with the elastic force of the spring element 78, wherein by adjusting the pressure of the second diaphragm 82 through ON/OFF control with respect to the second electromagnetic valve 106, a suck back amount of coating liquid which is sucked in by the third diaphragm 86 can be controlled with high precision.

Further, in the embodiment of the invention, an electrical current supplied to the first flow amount control device 115a and the second flow amount control device 115b is increased/decreased, and a generated heat of an electrical resistance body is likewise increase/decreased, whereby the thin film 139 can be made to flex toward the nozzle 129. Accordingly, a separation between the nozzle 129 and the thin film 139 is freely adjusted under a flexure action of the thin film 139, and thereby a fluid amount of pressurized fluid which flows through nozzle hole 127 can be adjusted. In this case, by blocking the nozzle hole 127 by the thin film 139 under a flexure action thereof, flow of pressurized fluid can also be interrupted.

Accordingly, the pilot pressure supplied to the ON/OFF valve 26 and the pilot pressure supplied to the second diaphragm chamber 82 are precisely controlled, respectively, through the first flow amount control device 115a and the second flow amount control device 115b, together enabling further improvement in the precision and responsiveness of the ON/OFF valve 26.

Specifically, by controlling the pilot pressure supplied to the ON/OFF valve 26 in accordance with the first flow amount control device 115a and second flow amount control device 115b, as compared to the prior art, the operational speed of the ON/OFF valve 26 is improved, together with enabling widening of its operating range. Further, by raising the switching speed at which the ON/OFF valve 26 switches between ON and OFF states, it becomes possible to highly accurately set the flow amount of coating liquid which is dripped onto the semiconductor wafer 146. Furthermore, because the thin film 139 facing the nozzle 129 is formed of a single crystal or a similar glass material, or the like, a flexure action which occurs at high frequency can be sufficiently withstood, and further, creeping is reduced and reproducibility is increased. As a result, little stress is imposed on the thin film 139, which is the driving part, and it excels in durability, and there is very little change in the performance thereof over time. Further, because it is possible to manufacture the same using semiconductor technology, there is the advantage that it can be mass-produced yet with high accuracy.

Further, in the present embodiment, the fitting 24, ON/OFF valve 26, suck back mechanism 28 and controller 32 are respectively assembled together in an integral manner, so that differing from the aforementioned conventional technology, there is no need for pipe connecting operations between the suck back valve 20 and the fluid pressure control apparatus, or between the suck back valve 20 and ON/OFF valve 26. Because there is no need to provide a dedicated space for attachment of the fluid pressure control apparatus and the ON/OFF valve 26, effective use of installation space can be achieved.

Further, in the present embodiment, because the ON/OFF valve 26 and controller 32, as so forth, are integrally formed with the suck back mechanism 28, in comparison to the conventional technique in which components which are constructed as respective separate parts are combined together, greater compactness of the apparatus can be achieved.

In addition, in the present embodiment, an increase in flow passage resistance can be avoided, because there is no need for installation of additional piping between the suck back valve 20 and the fluid pressure control apparatus.

Furthermore, as a result of making common the pressurized fluid (pilot pressure) supplied respectively to the suck back mechanism 28 and the ON/OFF valve 26, and controlling the flow amount through the first flow amount control device 115a and second flow amount control device 115b, unlike the conventional technique, a driving apparatus for driving the ON/OFF valve 26 becomes unnecessary. As a result, it becomes possible to further reduce the overall scale of the apparatus, and to achieve a cost reduction as well.

In the present embodiment, the pilot pressure supplied to ON/OFF valve 26 and to the suck back mechanism 28 through the first flow amount control device 115a and the second flow amount control device 115b is controlled electrically by the main control unit 108. In this case, an improvement in response accuracy of the second diaphragm 80 which is operated according to the pilot pressure becomes possible, and the coating liquid remaining in fluid passage 38 can be sucked more rapidly.

What is claimed is:

1. A suck back valve comprising:

a connector having a fluid passage and formed with a first port on one end and a second port formed on another end thereof;

a suck back mechanism for sucking a fluid inside of said fluid passage by a negative pressure action of a flexible member displaced in accordance with a pilot pressure;

an ON/OFF valve for opening and closing said fluid passage in accordance with an action of said pilot pressure;

a controller having therein disposed a sucking amount control mechanism for electrically controlling a flow amount of a fluid which is sucked by said suck back mechanism;

a displacement detection means for detecting a displacement amount of said flexible member and outputting a detection signal thereof to said controller, wherein said sucking amount control mechanism includes a spring member which presses said flexible member by an elasticity of the spring member, and a plurality of electromagnetic valves for adjusting a pilot pressure supplied to said suck back mechanism by activation and deactivation signals issued from said controller, wherein the displacement amount of said flexible member is controlled by equalizing said pilot pressure and a biasing strength of said spring member in accordance with a pressure-adjusting action of said electromagnetic valves.

2. The suck back valve according to claim 1, wherein said controller includes a first flow amount control element and a second flow amount control element for controlling pilot pressures respectively supplied to said suck back mechanism and said ON/OFF valve.

3. The suck back valve according to claim 2, wherein said flow amount control elements comprise:

a container, having a part thereof formed with a membrane, and enclosing a fluid which is expandable/compressible by heat;

a nozzle facing the membrane of said container; and heating means for heating a fluid inside said container.

4. The suck back valve according to claim 2, wherein said controller comprises a main control unit controlling respectively electromagnetic valves and a flow amount control device.

5. The suck back valve according to claim 1, wherein said connector, said suck back mechanism, said ON/OFF valve and said controller are assembled together integrally.

6. The suck back valve according to claim 1, wherein said flexible member comprises a diaphragm.

7. The suck back valve according to claim 1, wherein said suck back mechanism comprises:

a diaphragm displaced under action of a pilot pressure supplied from a pressurized fluid supply port;

a stem displaceably disposed inside a valve body and displaceable integrally with said diaphragm;

another diaphragm connected to an end of said stem and providing a negative pressure action by displacement together with said stem; and said spring member biasing said stem in a fixed direction.

8. The suck back valve according to claim 1, wherein said displacement detection means comprises an encoder.

* * * * *